United States Patent [19]
Weida et al.

[11] Patent Number: 6,108,670
[45] Date of Patent: Aug. 22, 2000

[54] CHECKING AND ENABLING DATABASE UPDATES WITH A DYNAMIC, MULTI-MODAL, RULE BASED SYSTEM

[75] Inventors: Robert Anthony Weida, New York, N.Y.; Arthur Reginald Greef, Seattle, Wash.; Frank Vincent Castelucci, Amawalk, N.Y.; Thomas Robert Maguire, Brewster, N.Y.; Carlos Bernadino Elezar Perez, New York, N.Y.; Dawn Marie Lemrise, Bristol, Conn.

[73] Assignee: International Business Machines Corporation, Armonk, N.Y.

[21] Appl. No.: 09/223,160

[22] Filed: Dec. 30, 1998

Related U.S. Application Data

[63] Continuation-in-part of application No. 08/977,018, Nov. 27, 1997, Pat. No. 6,014,657, and a continuation-in-part of application No. 08/976,652, Nov. 24, 1997, Pat. No. 5,953,726, and a continuation-in-part of application No. 08/977,092, Nov. 24, 1997.

[51] Int. Cl.$^7$ .................................................. G06F 17/30
[52] U.S. Cl. .......................... 707/203; 707/200; 707/1; 707/2; 707/4; 709/302
[58] Field of Search .................................. 707/200, 1, 2, 707/203, 4; 709/302

[56] References Cited

U.S. PATENT DOCUMENTS

| | | | |
|---|---|---|---|
| 4,809,170 | 2/1989 | Leblang et al. | 395/703 |
| 5,584,026 | 12/1996 | Knudsen et al. | 707/1 |
| 5,586,330 | 12/1996 | Knudsen et al. | 395/705 |
| 5,594,899 | 1/1997 | Knudsen et al. | 707/2 |
| 5,596,752 | 1/1997 | Knudsen et al. | 395/701 |
| 5,649,200 | 7/1997 | Leblang et al. | 395/703 |
| 5,682,535 | 10/1997 | Knudsen et al. | 395/701 |
| 5,862,325 | 1/1999 | Reed et al. | 709/201 |
| 5,897,639 | 4/1999 | Greef et al. | 707/103 |
| 5,918,210 | 6/1999 | Rosenthal et al. | 705/7 |

*Primary Examiner*—John E. Breene
*Assistant Examiner*—Cheryl Lewis
*Attorney, Agent, or Firm*—Steven J. Meyers

[57] ABSTRACT

Software modules which are not part of a database systems source code is provided for interactively maintaining the semantics of concept hierarchies when concept properties and concept interrelationships are modified. These separate modules include command and rules modules. Each of the commands in the command module are linked to the appropriate rules in the rules module. The rules module is bifurcated into a check section and an action section. If the command does not violate any applicable rule in the rules section, the action section implements the command. If the command violates one or more applicable rules, the action section suggests alternate action. If no suitable action can be found, the action section implements reverse commands to return the database to its unaltered state.

19 Claims, 11 Drawing Sheets

FIG. 2

Maint 2 Item View (Computer)

[Delete] [Options] [Close]

Current Option: Show All Attributes and All Values

Mutiple Values  OFF

Item Name  Computer

Properties

| Categories | Defining | Describing | Associations |
|---|---|---|---|

| Name | Value Type | Values | Defined in | Assigned in | ID |
|---|---|---|---|---|---|
| ☑ Form Factor | Text | | Computer | Computer | 0 |
| ☑ Color | Text | | Computer | Computer | 1 |

[Add] [Modify] [Remove] [Move]

CHECKING AND ENABLING DATABASE UPDATES WITH A DYNAMIC, MULTI-MODAL, RULE BASED SYSTEM

RELATED PATENT APPLICATIONS

1. This is a continuation-in-part of U.S. patent application Ser. No. 08/977,018 filed on Nov. 27, 1197 and entitled "Checking and Enabling Database Updates with a Dynamic Multi-Modal, Rule Based System" U.S. Pat. No. 6,014,657. The contents of the above identified application are hereby incorporated by reference.

2. This is a continuation-in-part of U.S. patent application Ser. No. 08/976,652 filed on Nov. 24, 1997 and entitled "Method and Apparatus for Maintaining Multiple Inheritance Concept Hierarchies", U.S. Pat. No. 5,953,726. The contents of the above identified application are hereby incorporated by reference.

3. This is a continuation-in-part of U.S. patent application Ser. No. 08/977,092 filed on Nov. 24, 1997 and entitled "A Method and Apparatus for Navigating Multiple Inheritance Concept Hierarchies", pending. The contents of the above identified application are hereby incorporated herein by reference.

4. U.S. patent application Ser. No. 08/472,414 filed on Jun. 7, 1995 and entitled "Method and Apparatus for Representing Knowledge About Entities", abandoned. The contents of the above identified application are hereby incorporated herein by reference.

5. U.S. patent application Ser. No. 08/688,350 filed on Jul. 30, 1996 and entitled "Enhanced Tree Control System for Navigating Lattices Data Structure & Displaying Configurable Lattice Node Labels", pending. The contents of the above identified application are hereby incorporated herein by reference.

6. U.S. patent application Ser. No. 08/725,961 filed on Oct. 7, 1997 and entitled "Enhancing Feature Based Search Through Feature Relevance Reasoning", U.S. Pat. No. 5,897,639. The contents of the above identified application are hereby incorporated herein by reference.

7. U.S. patent application Ser. No. 08/978,712 filed on Nov. 26, 1997 and entitled "Method for Migration of Tabular Information into a Frame Based Hierarchial Scheme with Inheritance", pending. The contents of the above identified application are hereby incorporated by reference.

TECHNICAL FIELD

The present invention relates to a method and apparatus for modifying databases. More particularly, it relates to rule based checking of modifications to rich databases.

BACKGROUND

With the emergence of the Internet, there is considerable incentive to create semantically rich databases (or knowledge bases) for diverse applications ranging from electronic product catalogs and product configurators to medical terminology in clinical information systems. Database systems have been developed to handle such semantically rich database systems.

One type of database system is a hierarchial system. A hierarchy is a common method for organizing information. For example, the table of contents for a book, an index system for a library and a function chart for a company's departments are all hierarchical arrangements of information. A hierarchy comprises nodes and their interrelationships. When a hierarchy interrelates structured nodes, those nodes are commonly called concepts (other terms used for nodes include frames, individuals and classes). The structure of a concept is described by the use of characteristics called properties.

The meaning given to these concepts and their hierarchical interrelationship depends on the domain that is being represented by the hierarchy or structure. Structures comprising concepts and their interrelationships are commonly known as "part-of" decomposition hierarchies and "is-a" abstraction hierarchies.

A "part-of" decomposition hierarchy can be found in corporation departmental organization charts. Each sub-department is part-of a super-department. For example, the Electronic Catalog Division and Electronic Transaction Division are part-of the Electronic commerce Division. The Electronic Commerce Division and Information Distribution Division are part-of the Internet Division which is in turn part-of the Software Division.

An "is-a" abstraction hierarchy can be found in biological animal and organism classification charts. Each sub-abstraction is-a more specific (specialized) description of a super-abstraction. For example, the family of lions and the family of tigers are more specific descriptions of the family of large cats. The family of large cats and the family of humans are more specific descriptions of the family of mammals. The sub-concepts in these hierarchies usually share common properties with their super-concepts. To minimize the amount of stored data common properties are defined in a super-concept and sub-concepts "inherit" (access, use) the super-concept's properties as part of their own definitions. Hierarchies with this characteristic are termed inheritance hierarchies. When a sub-concept interrelates to only one super-concept, the hierarchy is termed a single inheritance concept hierarchy, and when a sub-concept interrelates to more than one super-concept, the hierarchy is termed a multiple inheritance concept hierarchy. An example of a multiple inheritance concept hierarchy is found in the above mentioned U.S. application, Ser. No. 08/4712,414, abandoned.

A way of visualizing hierarchical data structures is by using a tree view as shown in FIG. 1. One method for visualizing any structured node in the tree view of FIG. 1, in combination with that node's properties, would be to use a concept view as shown in FIG. 2. The example given in FIG. 2 is for the "Mobile" structured concept 101 of FIG. 1.

A user can view the concept hierarchy shown in FIG. 1 by starting at the root concepts "Company" or "Function" and continue thru the sub-concepts until the leaf concepts are reached. At each concept, a concept view, such as the one of FIG. 2, can be consulted for a detailed examination of the structure of the concept. Switching back and forth between hierarchial and concept type views is a popular method of investigating concept hierarchies.

The data structure shown in FIGS. 1 and 2 is created and maintained by either or both a human agent using a Graphic User Interface (GUI) (e.g. an information architect) or a computer agent (a software program acting on behalf of a human). A human or agent incrementally creates the data structure, representing some domain in the real world, by first adding base concepts and their property definitions. Ideally, this creation process would continue until the entire data structure is created and the whole domain is succinctly represented. In reality, however, the process of realizing a final data structure is one of continual revision and refinement. There is a continual process of creation and modification as new concepts are introduced and old ones modified.

Because of the nature of hierarchical data structures with inheritance characteristics, many of the concepts are highly interrelated and their properties are non-localized. The creation of such data structures is a process of building increasingly complex data structures upon previously created data structures.

Software checkers for internal consistency of the database are usually implemented as part of the system source code.

System triggers, which go into effect when a user attempts to modify data with an insert, delete or update command, can also be used. Both can prevent incorrect changes to maintain integrity of the database.

For a number of reasons, the above described means of checking have proven to be extremely complex in implementation in connection with semantic databases. The first reason is that ensuring correctness (i.e., Internal Consistency) of content in a semantic database is more complicated than for traditional databases due to several factors: the complexity of the representation formalism used to express database content; the complexity of the content itself; and the complexity of operations to modify the database.

A second reason why the previously described means of checking have been complex is that the scope and extent of consistency checking which is required for a semantic database can vary:

a) as the representation formalism evolves (e.g., enhanced expressiveness enables more powerful reasoning services such as automatic classification which in turn imposes more stringent requirements on the content);

b) across different applications of the semantic database system (an application for computer system configuration imposes more rigorous requirements than an application for selection of pre-configured systems);

c) and across different phases of development within a single application (e.g., minimal checking may be appropriate when initializing a semantic database by importing data en masse from external sources. More substantial checking may be desirable later on, as the data is "cleaned up" under the auspices of the semantic database system).

Therefore, it is an object of the present invention to provide a computer directed method for modifying semantic databases.

It is another object of the present invention to maintain semantic coherence when modifying semantic databases.

BRIEF DESCRIPTION OF THE INVENTION

In accordance with the present invention, the problem of modification of the data structure of a database is solved by providing checking software modules, which are not part of the main system's source code, to interactively maintain the semantics of concept hierarchies when concept properties and concept interrelationships are modified. These separate modules include command and rules modules. Each of the commands in the command module are linked to the appropriate rules in the rules module. The rules module contains checks with associated actions. If the command does not violate any applicable rule in the rules module, the command is executed. If the command violates one or more applicable rules, the action section may attempt or suggest alternate action. If no suitable action can be found, reverse or undo commands are executed to return the database to its unaltered state. To delete, add or modify the relationships between the various concepts, property declarations, property constraints and relationships there between, the above arrangement: i) first recognizes and disambiguates possible semantic incoherence introduced by the changes, ii) may suggest alternative procedures to ameliorate any perceived incoherence, iii) may thereafter interactively allow an agent (user or machine) to select from one of the alternatives, and iv) finally, perform any available sequence of necessary operations to resolve semantic incoherence in the modified database, and if no suitable action is acceptable, return the database to its unaltered state.

The instant system, when compared with directly implemented semantic checking, has several major advantages:

(1). This modular rule based system of semantic checking fosters a clean separation between database update operations and checking/enabling preconditions for those operations. This separation simplifies the task of revising and extending the system's semantic checking capabilities.

(2). This system's semantic checking behavior can be changed at run time by selecting among the different "modes" for which rule checks and rule actions have been defined.

(3). Applications can readily customize semantic checking for their own needs by adding, removing and/or replacing rule checks and/or their rule actions.

The instant system also offers advantages over the use of database triggers. A trigger is associated with an attempt to change a particular type of database entity, independent of the command which attempts the change. Triggers are used to ensure that all possible changes to particular entities are verified. In contrast, in the instant invention rule checks are tied to particular commands, so it is straightforward to determine that every command is being appropriately checked by examining the associated rule checks. This approach is more desirable for rich semantic databases, which have highly interdependent entities, because updates can have complex, far reaching consequences. Moreover, both rule checks and their associated rule actions can be tailored to the specifics of different commands.

BRIEF DESCRIPTION OF THE DRAWINGS

These and other objects, features and advantages of the invention can best he understood by reference to the following detailed description while making reference to the accompanying drawings of which

FIG. 2 is a computer screen presentation showing the properties of one of the concepts shown in FIG. 1;

DETAILED DESCRIPTION OF THE INVENTION

Figure 3:
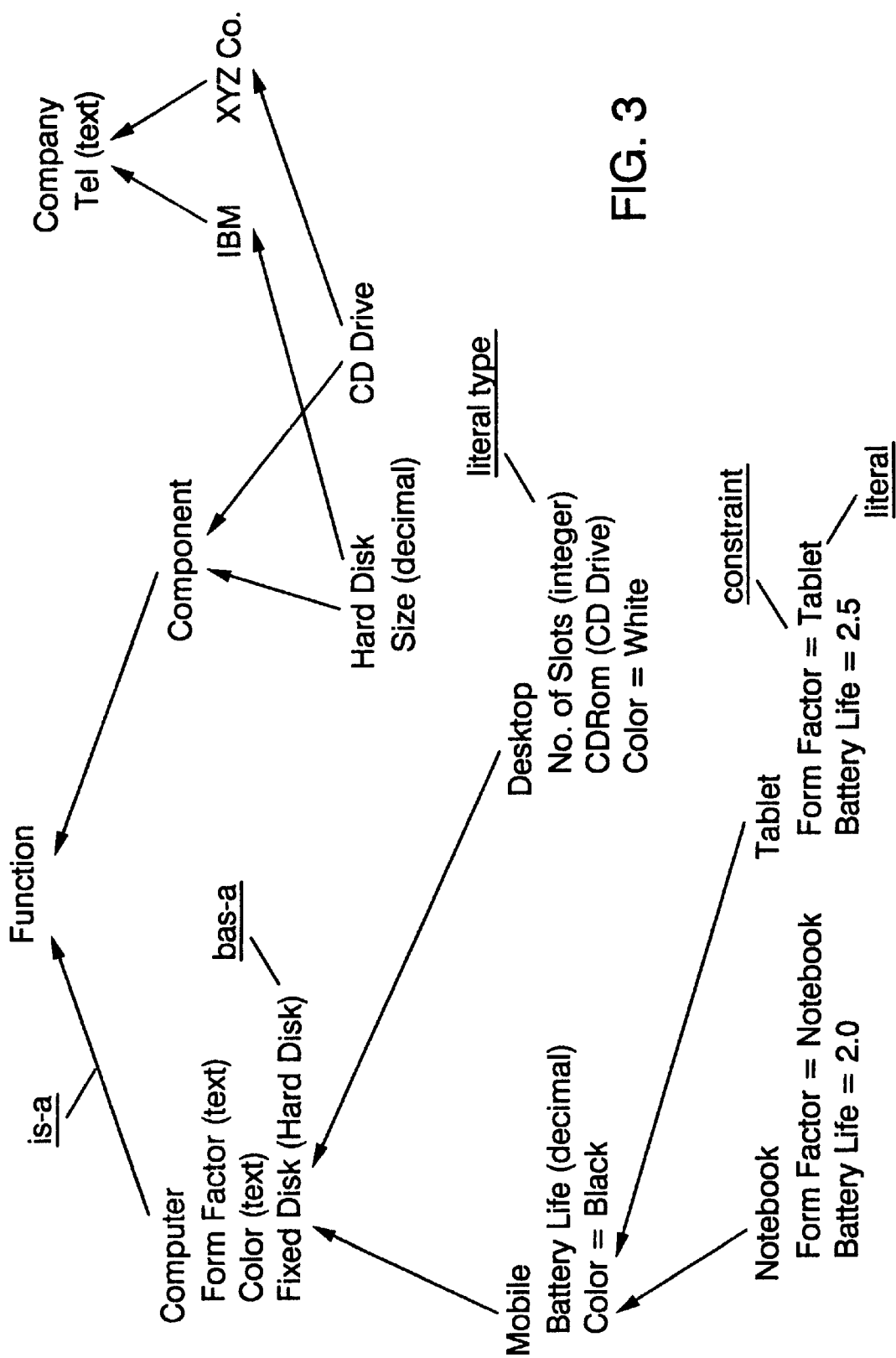
FIG. 3 is a graphical representation of a multiple inheritance concept hierarchy to which the present invention is applied.

In FIG. 3, the concepts "Function" and "Company" are termed "root" concepts (they have no super-concepts) and concepts "Notebook", "Tablet", "Desktop", "Hard Disk" and "CD Drive" are termed "leaf" concepts (they have no sub-concepts). The concept "Hard Disk" inherits properties from both the concepts "Component" and "IBM". Thus, FIG. 3 shows a multiple inheritance concept hierarchy. Properties that have been inherited by a sub-concept from a super-concept are termed "inherited properties" of the sub-concept. Those that are declared within a concept are termed "local properties" of the concept.

In making a change in the structure of a hierarchy, the effect the changed portion has on the remainder of the hierarchy must be taken into account. For instance in FIG. 3, assume the concept "Mobile" is to be eliminated. The declaration of "Battery Life" and the constraint of "Black" for the declaration "Color" must be moved. If "Desktop" computers are to be black rather than white, the constraint color could be moved to the super-concept "Computer" since the restriction would apply equally well to "Notebook", "Tablet" and "Desktop" computers. Otherwise, the constraint must be listed in both the "Notebook" and "Tablet" concepts. Since "Battery Life" does not apply to "Desktop", that declaration must be dropped to the leaf concepts of "Notebook" and "Tablet".

Therefore, it is understood that rules used to establish the above described hierarchy or any other database must be followed when portions of the database are changed, deleted or added to. These rules are first checked when concepts, concept interrelationships and properties are created. The rules must then be enforced when modifying the data structure. Rules for the database shown in FIG. 1 include:

1. Interrelationships between concepts must not contain cycles. For example, in FIG. 3, we could not have "Mobile" as a sub-concept of "Computer" and "Computer" a sub-concept of "Mobile".
2. A super-concept must always exist if it has interrelated sub-concepts. For example, in FIG. 3, the concept "Computer" must always exist if the concepts "Mobile" and "Desktop" are its sub-concepts.
3. The type of a property must always exist. For example, in FIG. 3, the property "Fixed Disk (Hard Disk) always relies on the existence of the concept "Hard Disk". The concept "Hard Disk" cannot be removed if there are properties that depend on its existence as a type of a property.
4. A property must always exist if there is a constraint that constrains the property. For example, in FIG. 3, the "Form Factor" property declaration in concept "Computer" must always exist as long as the constraints "Form Factor Notebook" and "Form Factor=Tablet" depend on its existence.
5. A property can only be constrained at a concept if the property declaration is accessible at that concept i.e., the property is either declared in the same concept as the constraint or the property can be inherited for some super-concept in its lineage. For example, in FIG. 3, the property "Battery Life" in concept "Mobile" cannot be constrained in the concept "Desktop". The property declaration is not accessible to the concept "Desktop". The property can, however, be constrained at both the concept "Mobile" and the concepts "Notebook" and "Tablet".
6. No two properties can have the same name in the same concept. For example, in FIG. 3, it is not possible to declare another property "Form Factor (integer)" in concept "Computer".

Figure 12:
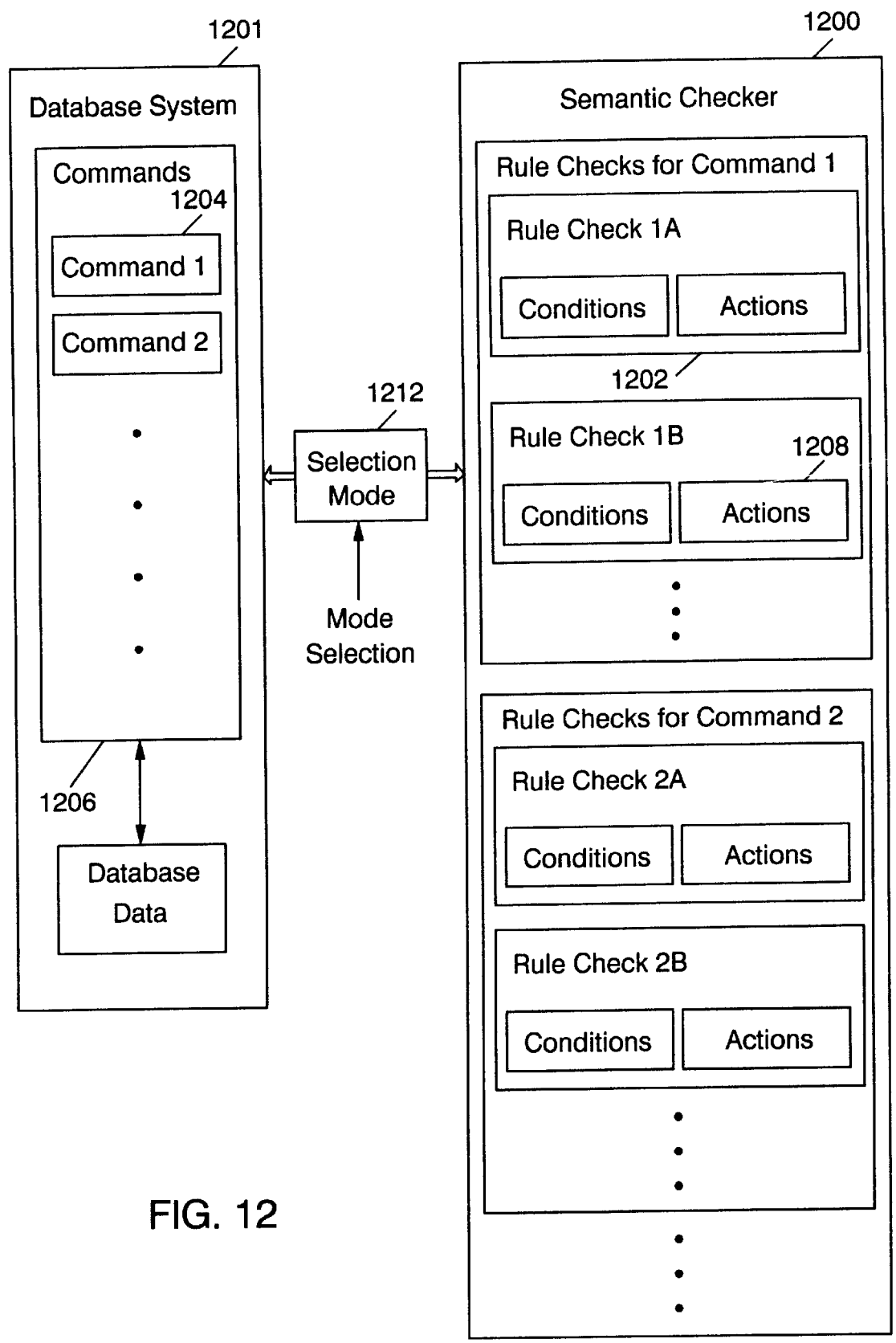
FIG. 12 is an illustration of the arrangement between commands, rule checks and actions in the present invention.

Rules like the ones listed above cannot be violated when making modifications if the integrity of a database content is to be preserved. A modification checking and enabling system for a database is referred to as a "semantic checker". In a semantic checker, rule checks of the above rules are associated with commands that modify the database. The conditions of those rules are used to decide whether suitable preconditions exist for proposed modifications to the database. If not, associated actions, if any, are called upon in an attempt to bring about such preconditions. If the preconditions remain unmet, the semantic checker prevents the proposed modifications. As shown in FIG. 12, rule checks for rules such as the ones listed above, are encapsulated in a semantic checker module 1200 separate from the code and data 1201 of the database system, and a rule 1202 only associated with commands 1204 contained in the command module 1206. This "loose-coupling" between commands and rules make it easy to update semantic checking without touching the remainder of the system.

Likewise, rule actions 1208 are encapsulated in the semantic checker module and only associated with their rule checks 1202 at run-time. Thus it is easy to update fixup behavior without touching the remainder of the system.

Additionally, different applications can customize semantic checking by adding, removing, or replacing specific rule checks (likewise rule actions) at run-time.

Further, due to the loose coupling between commands and rule checks, and the loose coupling between rule checks and rule actions, it is possible to vary the system's checking and fixup behavior according to circumstances at run-time. This implementation allows the semantic database system to operate in one of many possible disjoint modes 1212 two of which will be described hereafter.

Before proceeding further with the discussion of the flow diagrams of FIGS. 4 to 8, definition of some selected technical terms is appropriate.

Figure 1:
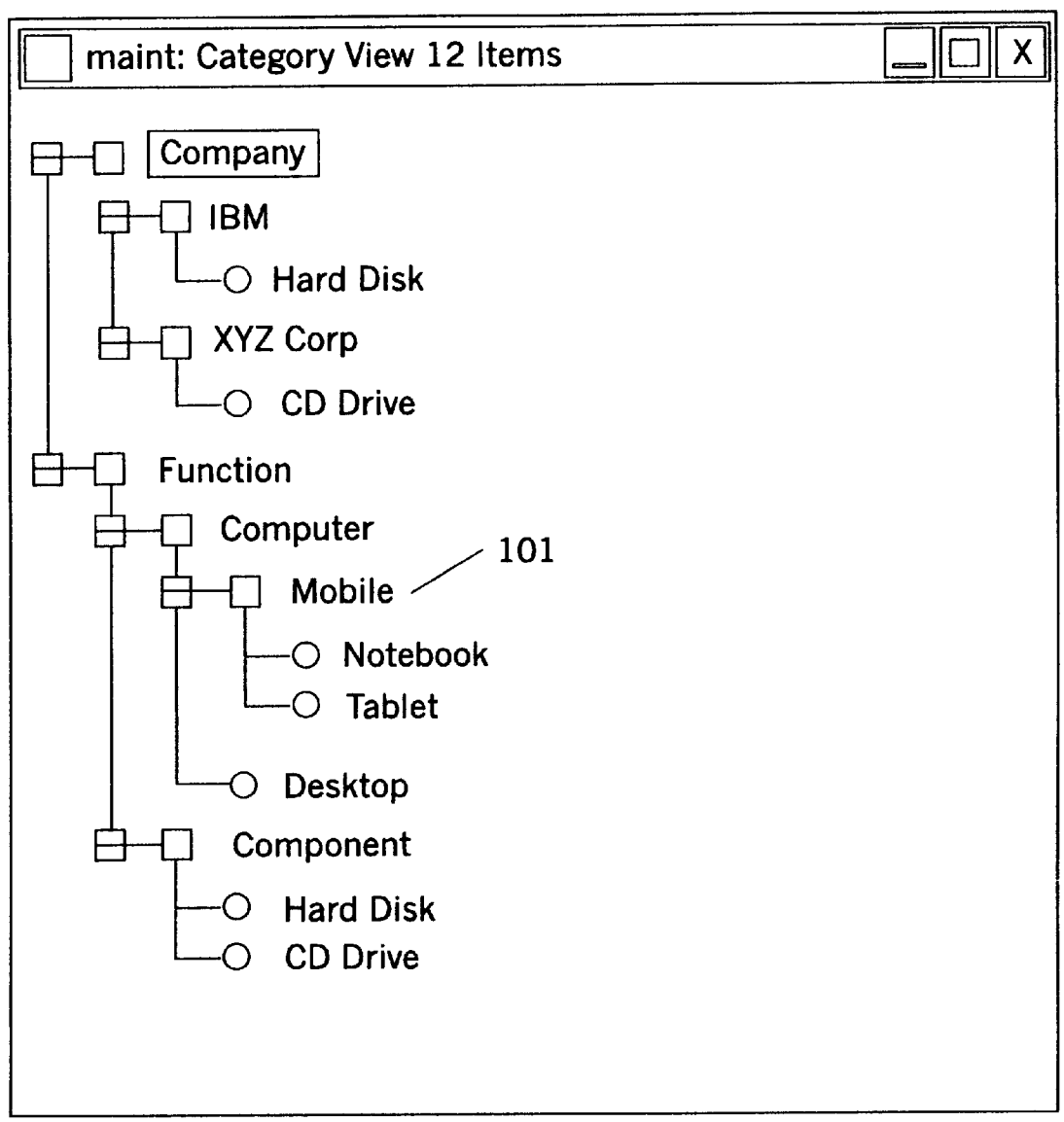
FIG. 1 is a computer screen presentation showing a hierarchial view of the concepts in a database.

An entity: is any constituent of a database. In a relational database, the entities include tables, columns, and rows. In a database, they include objects such as concepts and the concept's attributes. As shown in FIGS. 1 to 3, a hierarchial database intended for representation of computer systems would have concepts representing the computer systems and their components such as disk drives and printers.

A command: is used to encapsulate a request as an object, thereby letting you paramatize clients with different requests, queue or log requests, and support undoable operations. In an hierarchial system, commands can be executed to carry out database updates such as deleting concepts from the database. A generic "create concept" command can be thought of as a template which can be filled out to yield a specific command, e.g., a create concept XYZ command. We will use the word command for both the generic and specific cases; the intended meaning should be clear in context An undo command: reverses the effect of another command, e.g., the undo command associated with "create concept XYZ would be "delete concept XYZ". When a command is executed, it may be recorded and an undo command may be associated with it, so that the command can be undone later.

A production rule: (herein after referred to simply as a rule) consists of two parts; a condition and an action. The condition can be tested to decide if it is currently true or false. In case the condition is true, the rule is applicable, and the associated action can be taken. An example of a production rule is:

If an invention is useful, original and not obvious,

Then conclude that it may be patentable.

A rule based system employs a conflict resolution strategy to decide which rule(s) to execute when more than one is eligible. While numerous strategies are possible, in the disclosed embodiment all eligible rules are executed in sequence.

The term rule check is used for a rule which verifies and possible enables a precondition for execution of a command. Notice that if the rules condition is false, then preconditions for execution of the command are not met. Zero or more rule checks are associated with each command. Whenever a command is attempted, the system evaluates the associated rule checks. The set of rule checks is successful if all the rule checks are successful; it fails if any rule check fails. The command is executed only in the case where all of the rule checks are successful. As we will describe below, the set of rule checks associated with a generic command can vary from time to time as the system is running.

Each rule check has one or more rule actions which are executed when the rule check's condition fails. By default, there is a single rule action which simply reports the rule check's failure, thereby preventing execution of the command being checked against the rule. Alternatively, the rule action may attempt to ameliorate the failure by creating a suitable set of what we call "fixup" commands. "Fixup" commands are checked and executed just like any other commands. Assuming that the fixup commands execute successfully, the initial command will be executed.

A Transaction: consists of a sequence of related commands which are to be treated as a single unit of work. Should any command in the sequence fail, the effects of any preceding commands within the transaction are rolled back, i.e., undone, by means of the undo commands. The result is the same as if the transaction had never started. Assuming that all commands execute successfully, a transaction is explicitly either committed, in which case the effects of the commands persist, or aborted, in which case the commands are undone.

Figure 4:
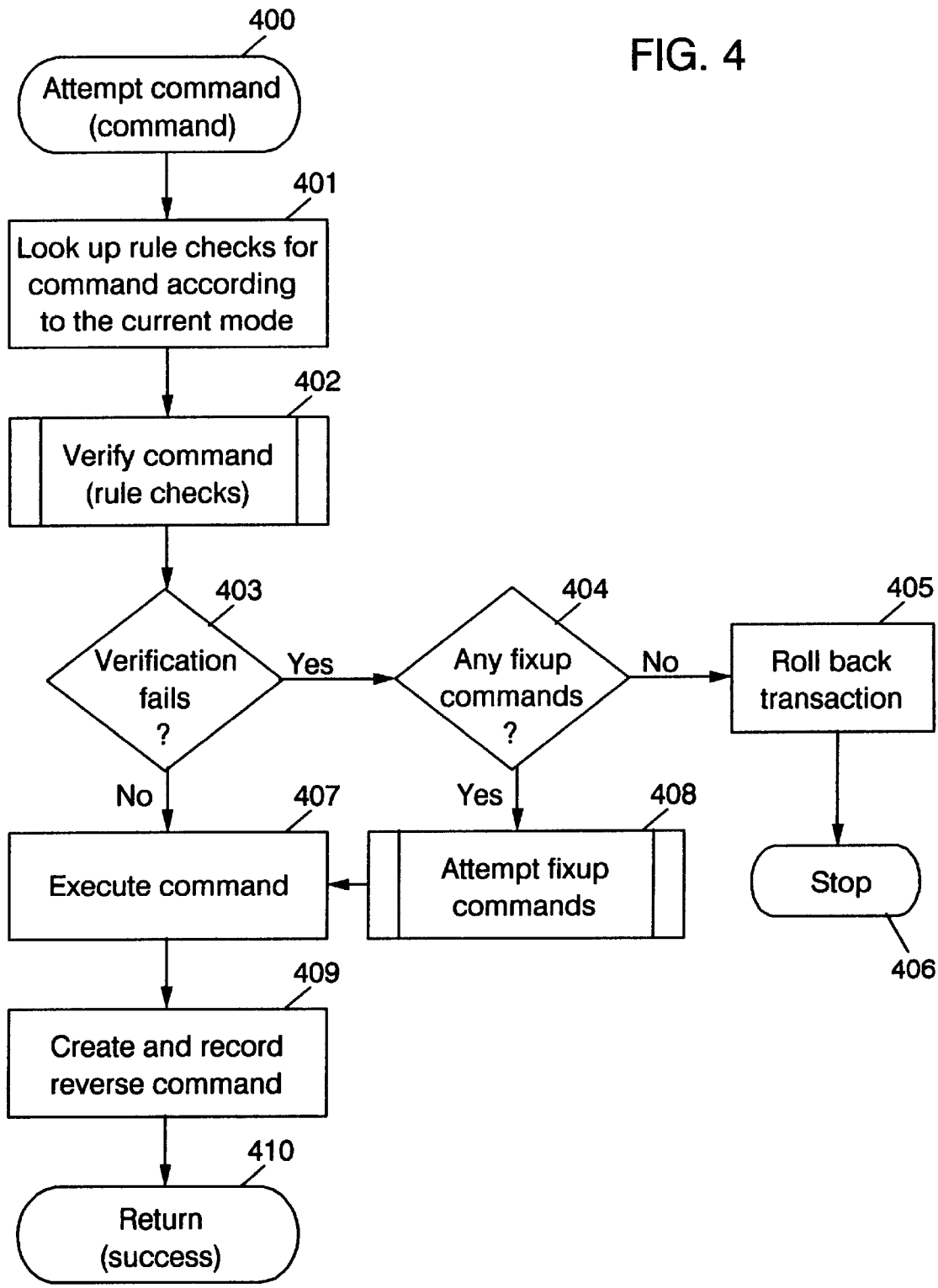
FIGS. 4 to 7 are flow diagrams of the functioning of a computer in accordance with the present invention.

The actual operation of the instant invention can be readily followed from the flow charts FIG. 4 to FIG. 7. The initial flowchart FIG. 4 depicts the "Attempt command" process for a given command at 400. It is initiated by looking up rule checks for the command according to the current mode at 401. This is followed by instructions that attempt to verify the command according to its rule checks at 402. Query 403 is to whether verification fails. If the answer is yes (it does fail), then the process proceeds to query 404, where it is determined whether any fixup commands are available for this command. In case the answer is no, the process proceeds to roll back the current transaction at 405, and stop at 406. If the answer at 404 is yes, the process attempts fixup commands at 408. If fixup commands complete normally at 408, the process goes on to execute the command that failed at 407, creates and records its reverse command at 409, and returns with success at 410. Should the query at 403 determine that verification does not fail (the answer is no), then the process executes the command at 407, creates and records its reverse command at 409, and returns with success at 410.

Figure 5:
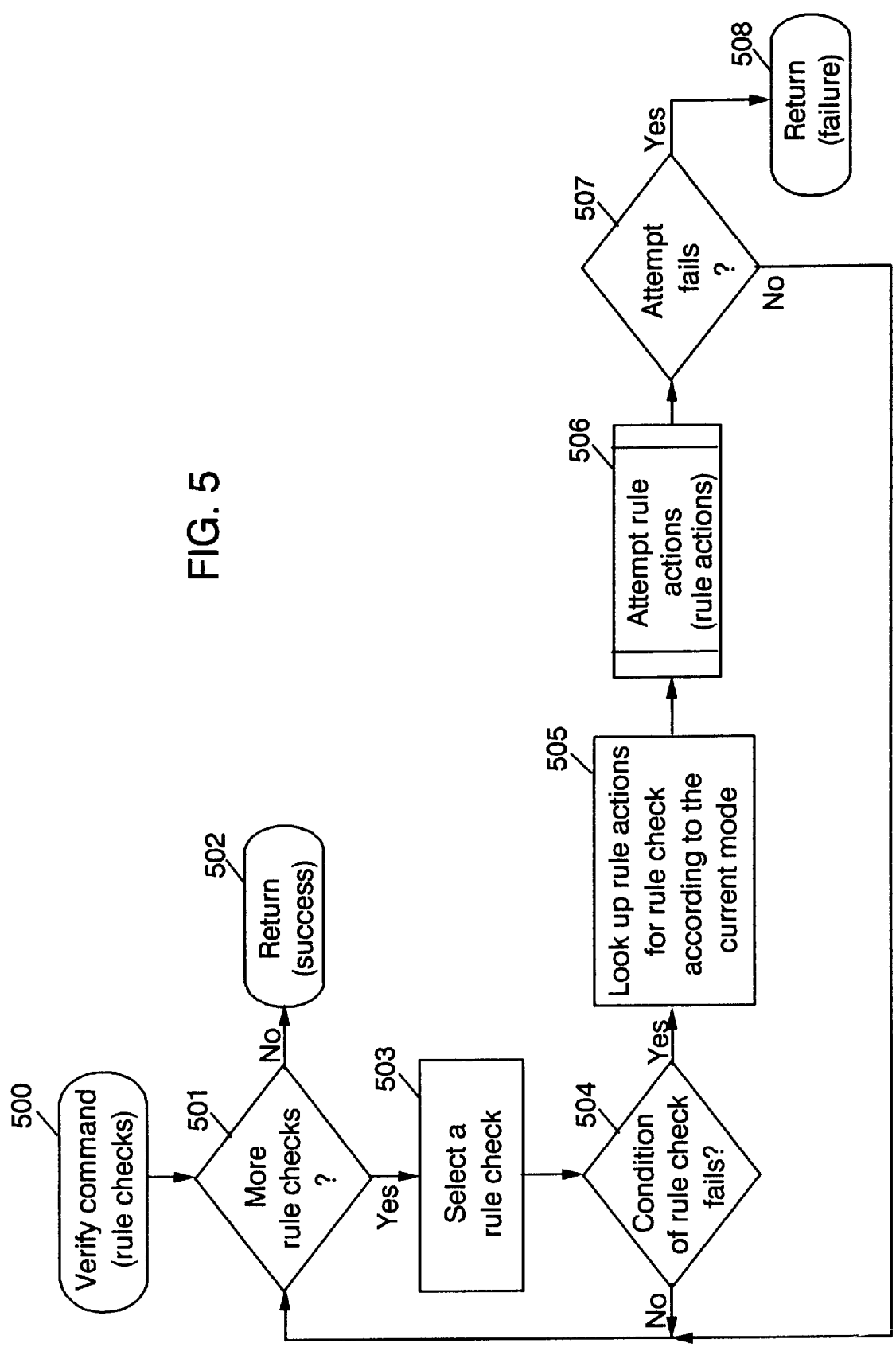

FIG. 5 depicts the process of attempting to verify a command according to its rule checks at 500, commencing with a query at 501 as to whether there are any more (as yet unchecked) rule checks. In case the answer is no, the process returns with success at 502. If the answer is yes, the process proceeds at 503 to select an (as yet unchecked) rule check. Then, at 504 it queries to determine if the selected rule check condition fails. If the result is no, the process goes back to 501. Otherwise, it goes on to 505 and looks up the rule actions for the selected rule check according to the current mode of operation. Following that, the process, at 506, carries out the instructions to attempt those rule actions. Should it be determined at 507 that the attempt failed, the process returns with failure at 508. On the other hand, if the attempt succeeds, it goes back to 501.

Figure 6:
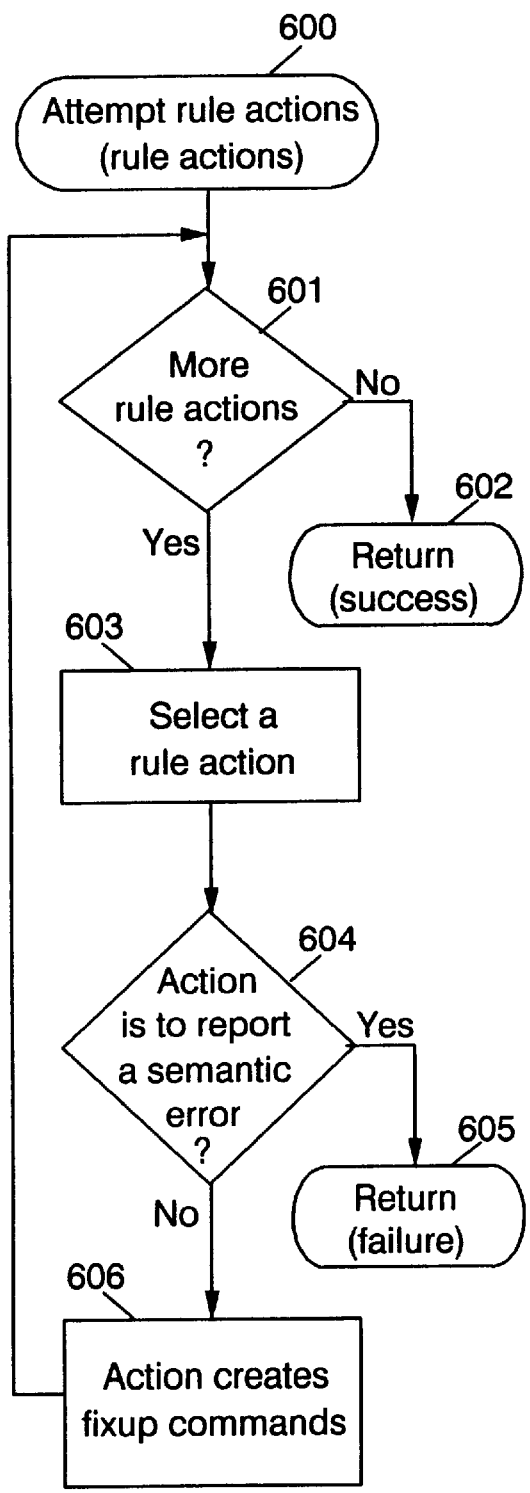

FIG. 6, starting at 600, depicts the process of attempting a given set of rule actions. At 601, the process determines whether any rule actions remain to be attempted. If the answer is no, it returns with success at 602. Alternatively, if an action remains at 603, it selects a rule action to be attempted. Where the rule action reports a semantic error (determined at 604), the process returns with failure at 605. Otherwise, the rule action creates one or more fixup commands at 606, then the procedure goes back to 601.

Figure 7:
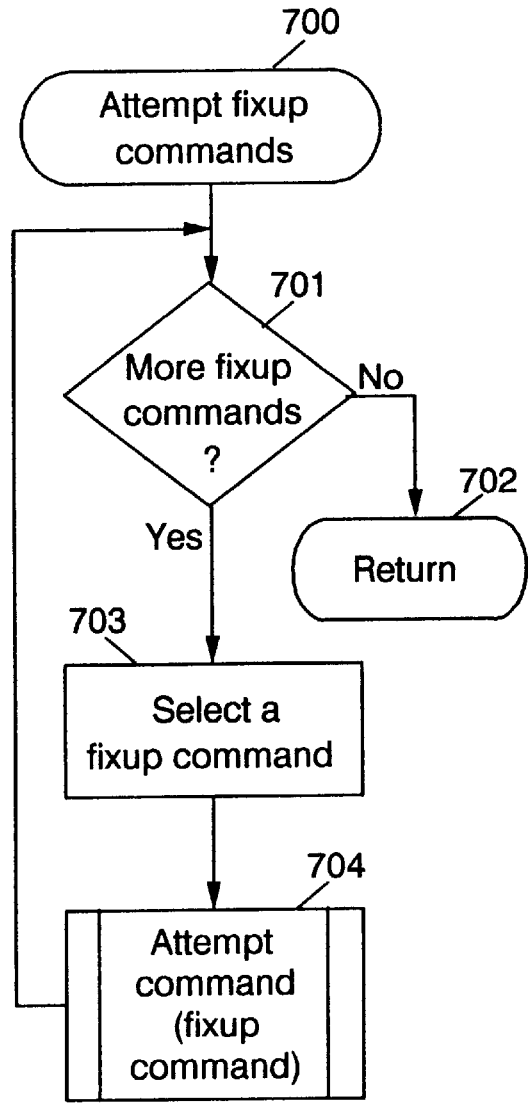

FIG. 7, beginning with 700, depicts the "Attempt fixup commands" process. A query for more (as yet unattempted) fixup commands is posed at 701. If none exist, the process returns at 702. Otherwise, an as yet unattempted fixup command is selected at 703, then instructions to attempt that command are followed at 704 (which recursively invokes the "attempt command" process at 400 of FIG. 4), followed by a transition back to 701.

As pointed out above, there are multiple modes of operation available, including either a "loose mode" (not related to loose coupling) or "strict mode", depending on whether one desires lenient or rigorous enforcement of prerequisites for commands. In strict mode, the rule checks associated with a particular command may have more stringent conditions and there may be additional rule checks associated with a command. In the same vein, the set of rule actions associated with a rule check may vary according to mode. For example, suppose a command to delete a certain concept is attempted. In loose mode, rule actions may take the liberty of deleting other concepts as required to satisfy the preconditions of the delete concept command. In strict mode, the command may just be disallowed. Note that in general, there is no limit on the number of modes or the manner in which modes are related. For example, modes may be organized hierarchically, such that each mode builds upon its predecessors by incorporating all of their rule checks and actions, as well as adding additional rule checks and actions of the additional mode. Also note that modes need not be identified with levels of semantic checking at all. As a further example, modes could be based on user expertise. In a simple approach, there could be a sophisticated user mode and a novice user mode, among others. Going further, user expertise could be gauged on a command-by-command basis via adaptive models as in IBM's COACH system.

The following are descriptions of a sample database modification:

Concept Deletion and Extraction includes:

1. Delete target is a single leaf concept. The user wishes to remove a concept from the hierarchy that has no children inheriting from it. This action deletes all constraints, then local property declarations in a concept and finally deletes the concept itself.
2. Delete target is a single intermediate concept. The user wishes to remove a concept from the hierarchy including any children inheriting from it. This action deletes all constraints, then local property declarations in all descendants of a concept, deletes the descendants and finally does the same for the concept itself. Also, any properties in the hierarchy that describe a relationship to the target or any of its children are deleted. This case is basically deleting a branch or branches of the hierarchy.
3. Delete target is a single intermediate concept. The user wishes to extract a concept from the hierarchy and re-parent its children. This action deletes all constraints, then local property declarations in a concept and then deletes the concept itself. Also, any properties in the hierarchy that describe a relationship to the target are deleted. If the target concept has multiple parents, its children are re-parented to the parent directly connected to the target in the Catalog view. This case is extracting a concept from a branch.

Concept Property Deletion and Modification includes:

1. Delete a property declaration including all its constraints in descendants. This action deletes all the property constraints in a concept and any of its descendants. Then the property declaration itself is deleted.
2. Promote a property declaration into an ancestor keeping all constraints. This feature allows the user to take an existing property declared in a concept and change the owner of the declaration to an ancestor up the hierarchy while preserving any existing constraints down the hierarchy.
3. Promote a constraint into an ancestor. This feature allows a user to take an existing constraint declared in a concept and change the owner of the constraint to an ancestor up the hierarchy.
4. Demote a property declaration into a descendent concept keeping all constraints. This feature allows the user to take an existing property declared in a concept and change the owner of the declaration to one or more of its descendants down the hierarchy while preserving any existing constraints down the hierarchy. Any constraints that no longer have access to the property declaration are deleted.
5. Demote a constraint to a descendent. This feature allows the user to take an existing constraint declared in a concept and change the owner of the declaration to one or more of its descendent down the hierarchy.
6. Promote a property across all siblings into a common ancestor keeping all constraints. This feature allows the user to take an existing property declared in a set of sibling concepts and change the owner of the declaration to a common ancestor up the hierarchy while preserving any existing constraints that may exist in the sibling concepts and their descendants. This is a macro operation on the micro operation described in 2.
7. Promote a constraint across siblings into a common ancestor. This feature allows a user to take a constraint that exists in several sibling concepts and move the constraint to a common ancestor. This is a macro operation on the micro operation described in 3. (Both 7 and 8 involve doing a search across the siblings for common property and constraint names or values and then applying the micro operations already described.)

Figure 8:
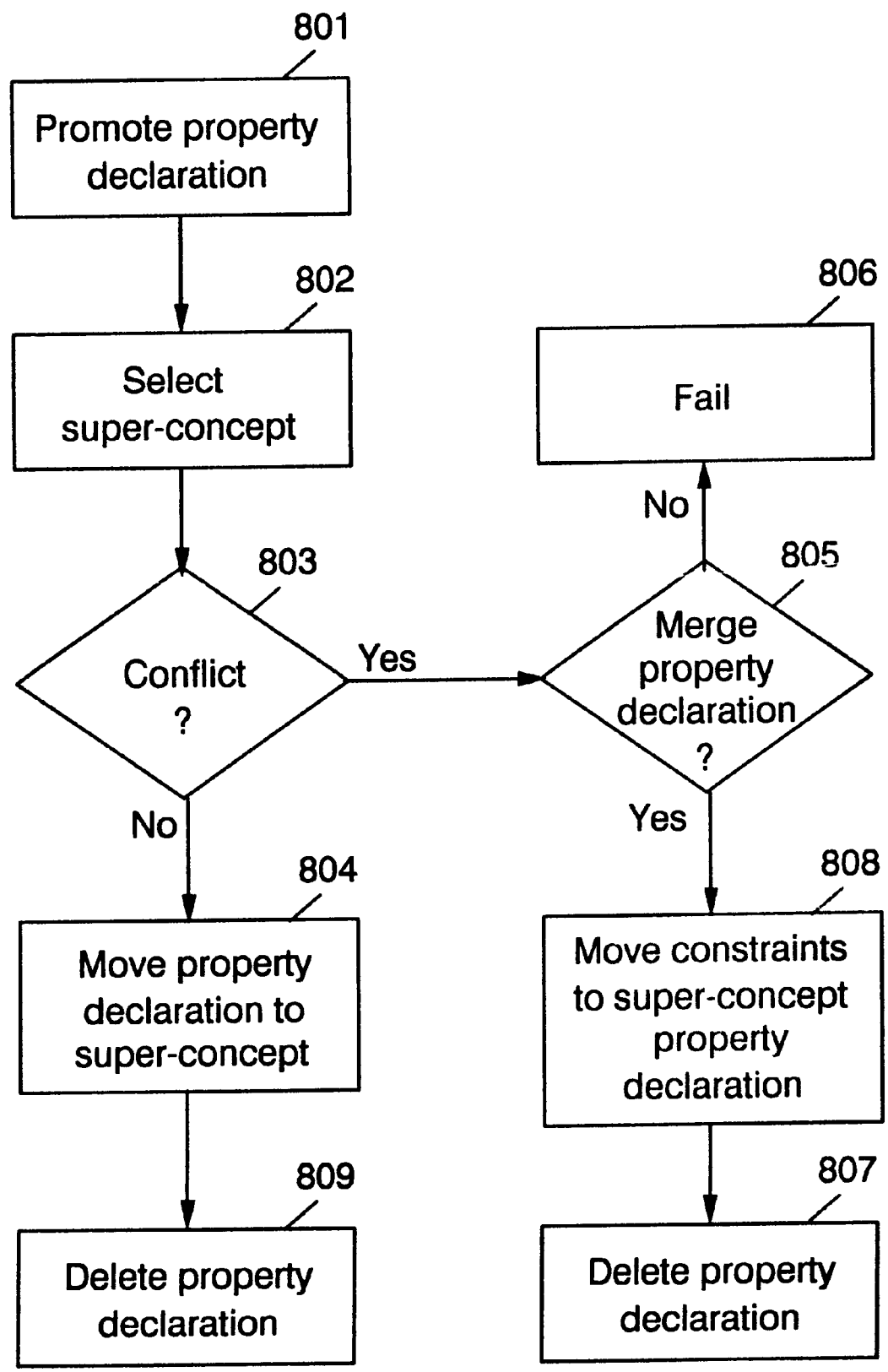
FIG. 8 is a flow diagram of one change in the hierarchial structure.

The methodology used by the software for interactively maintaining the semantics of concept hierarchies is shown in FIG. 8. Here the user elects to promote a property declaration from a concept to a super-concept. After a user selection of the super-concept 802, the software checks to see if this results in a conflict 803, and if it does not, the software moves the declaration to the super-concept 804 and deletes the property declaration from the concept 809. If there is a conflict, the user is asked if the declarations can be merged 805. If they cannot, the process fails 806. If the properties can be merged, its constraints are moved to the property declaration of the super-concept 808 and the property declaration to be moved is deleted 807.

An example of promoting a property declaration would be to promote the constraint "Black" for the declaration "Color" in the concept "Mobile" to the concept "computer" in FIG. 3. If a command for such a move were to be made, verification in step 403 would fail. Both "Mobile" and "Desktop" computers would have to be black. Since this is not the case, the command cannot be executed without change of the hierarchy constraints. Thus if it is decided that the property constraint should be accessible for all types of computers, desktop computers would now be black and the restraint black would be moved to "Computer". To do this, fixup commands are performed 408 and the original command is executed 407. A record is made of any steps necessary to reverse the process, and the process returns with "success" 410. If desk top computers shall remain white, the process of FIG. 4 fails and the process is rolled back 405 and the procedure ended.

Figure 9:
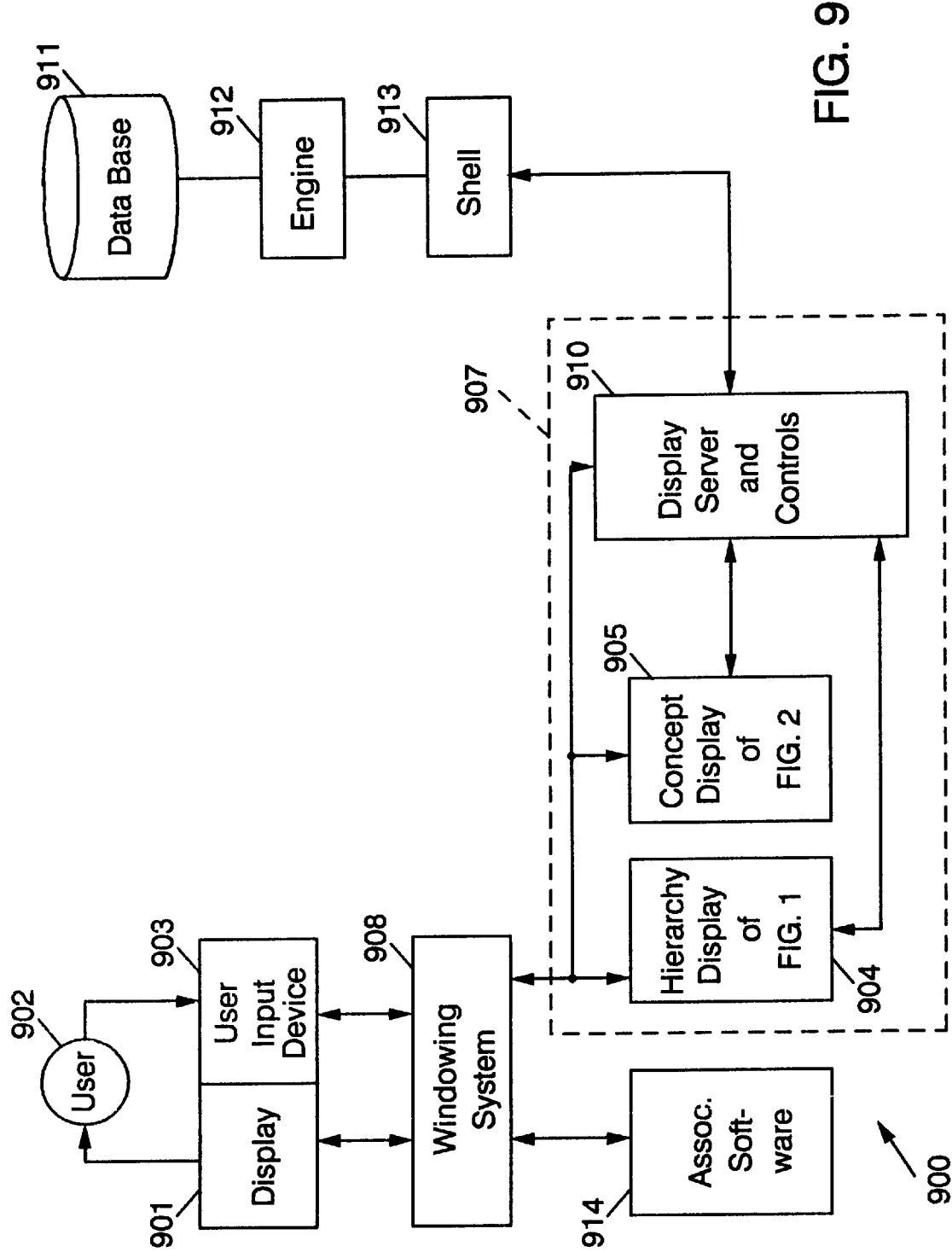
FIG. 9 is a logic block diagram indicating the functioning of a computer in accordance with the present invention.

Referring now to FIG. 9, the system 900 includes a computer display screen 901 which interacts with the user 902 through commands entered through user input device 903 (such as a mouse and keyboard) to present the screens 904 and 905 shown in FIGS. 1 and 2, respectively. The displays are provided by a search engine 907 in response to control signals inputted by the user 902 through the user interface device 903. A windowing system 908, such as the Windows NT or 95 operating systems of Microsoft corporation, acts as an intermediary between the search engine 907 and the user input device 903 and display 901. The search engine 907 includes the displays 904 and 905, a display server 910 for populating the displays of FIGS. 1 and 2 with data including that placed in the query list space 104 and 202 when they are invoked. The display server 910 receives data from the database 911 serviced by the database engine 912 through at hierarchial shell 913, such as one provided in accordance with the above mentioned U.S. patent application Ser. No. 08/472,414, abandoned.

Figure 10:
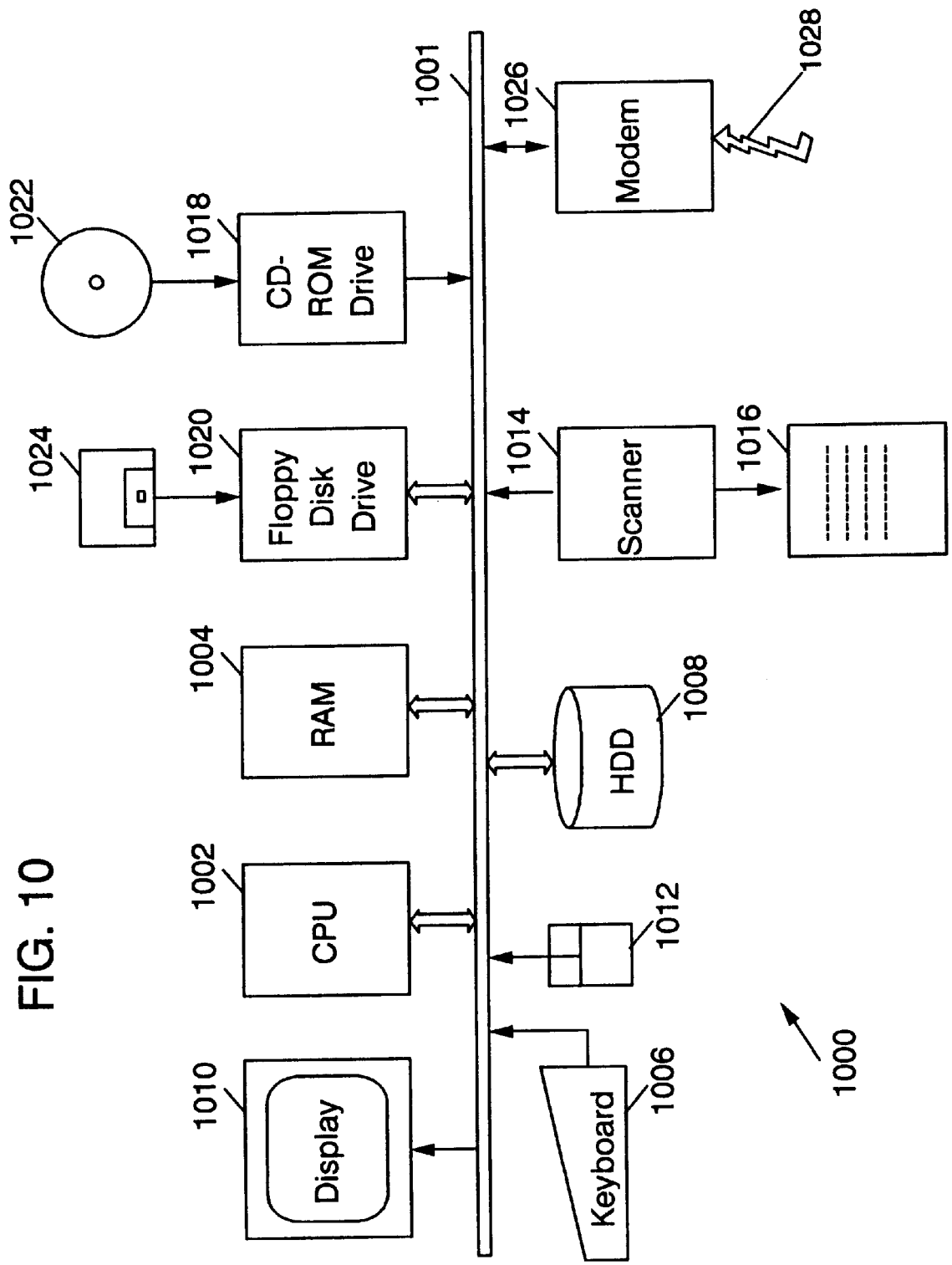
FIG. 10 is a block diagram of a computer system for use with the present invention.

The present invention is capable of running on any properly configured general purpose computer system, such as the one shown in FIG. 10. Such a computer system 1000 includes a processing unit (CPU) 1002 connected by a bus 1001 to a random access memory 1004, a high density storage device 10108, a keyboard 1006, a display 1010 and a mouse 1012. Also attached to the CPU 1002 by the bus 1001, are a scanner 1014 for scanning documents 1016 into the computer 100; and CD-ROM and magnetic disc drivers 1018 and 1020 for entry of information from optical and floppy magnetic disc mediums 1022 and 1024 containing the program code and data of the present invention. An example of such a computer is an IBM Personal Computer of the International Business Machines Corporation, such as an Aptiva L31 Model with a 233 Mhz Pentium processor of Intel Corporation operating under Microsoft Windows 95 operating system of the Microsoft Corporation.

Figure 11:
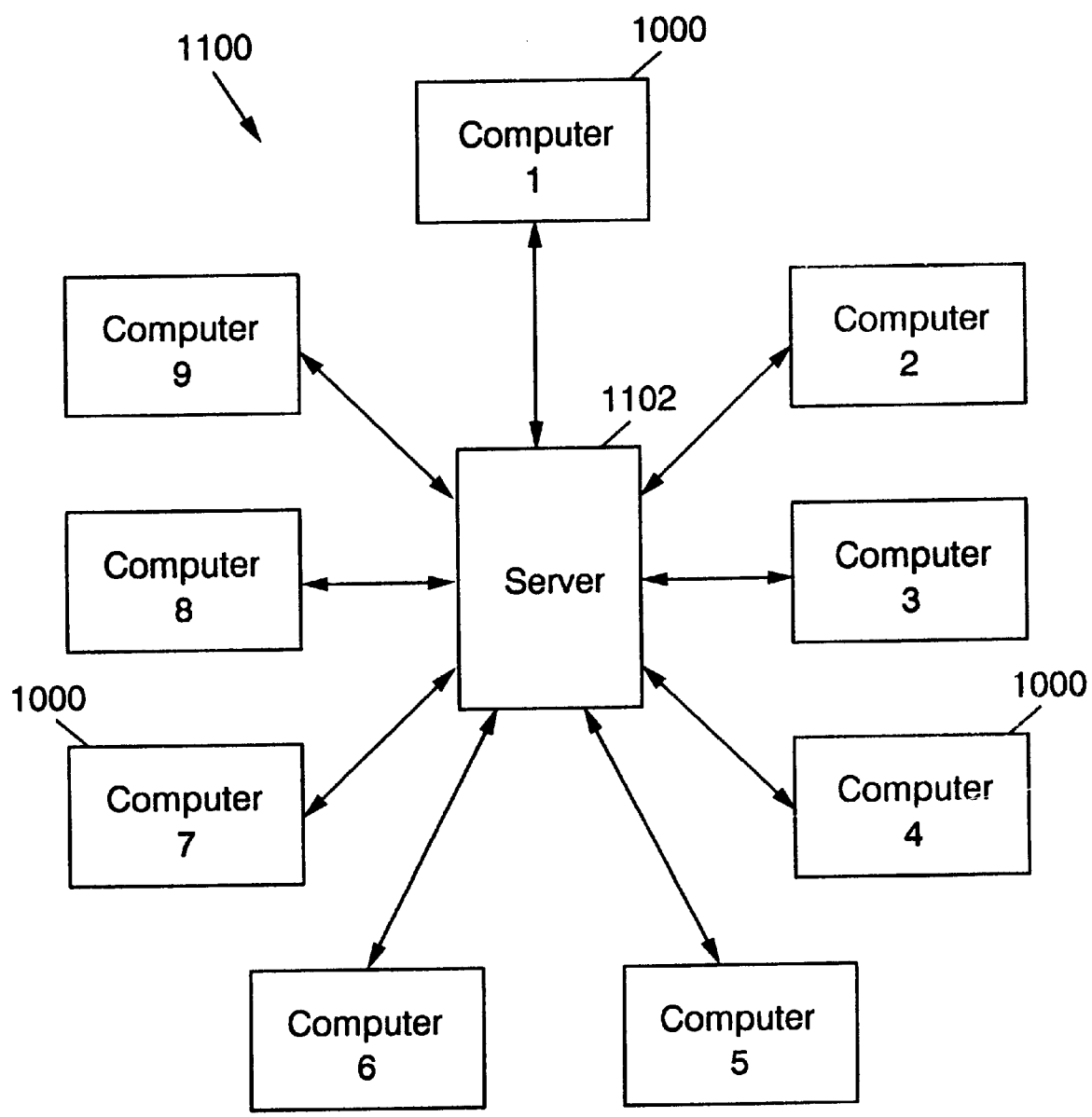
FIG. 11 is a block diagram of a network to which the present invention is applicable.

The computer 1000 also contains a modem 1026 for telecommunication of information 1028 on the Internet and other networks. As shown in FIG. 11, computers 900, like the one described above, are connected together in a network 1100 by a server 1102 that can be used to exchange information and one computer can access information contained in another. The database search engine and the checking and updating software, may be permanently located on all computers of the network, or can be on one computer, say computer 7, and transmitted through the medium of electromagnetic signals from that one computer to the other computers on the network when it is to be accessed and modified.

As shown in FIG. 12, the data 1200 is stored in a database 1202, such as the DE2 Relational Database of Internatioinal Business Machines Corporation. It is accessed through the database search engine 1203 and a multiple-inheritance concept hierarchy shell 1204 configured in the manner described in copending U.S. patent application Ser. No.

08/427,414 and entitled "Method and Apparatus for Representing Knowledge About Entities", abandoned. The data 1100 in the database 1202 can be accessed from Windows 95 compatible graphical user interface on the display 1010 of FIG. 10 with screens provided in accordance with the present invention.

Above we have described an embodiment of the invention. Modifications of that embodiment will be obvious to those skilled in the art. For instance, while the invention is described in terms of a particular hierarchial database structure, the invention is applicable to other types of databases both hierarchial and non-hierarchial. Therefore it is understood that the invention is not limited to the described embodiment but also covers embodiments within the spirit and scope of the appended claims.

What is claimed is:

1. A computer software product on a transporting medium for use in a computer system for checking and enabling updates in a database system, comprising:
   a rules software module separate from the code and data of the database system containing rule checks determining whether suitable preconditions exist for a modification to said database,
   a first command separate from the software module for carrying out the modification only when the suitable preconditions exist;
   linkage software for linking the first command to one or more of the rule checks in the rules module that determine if the preconditions exist; and
   action software for one or more rule checks within the rules module for providing alternative ways to bringing about said preconditions, if said one or more rule checks indicate the preconditions did not initially exist.

2. The computer software product of claim 1, including software code for providing one or more commands for reversing said first command where taken and when a further command involved in the update fails a rule check.

3. The computer software product of claim 1, including software code for altering semantic checking behavior at run time by selecting among different modes for which different rule checks and rule actions have been defined for the first command.

4. The computer software product of claim 3, wherein said linkage software is changeable for customization of said semantic checking in different database applications by adding to, removing from, and/or replacing said one or more rule checks associated with the first command.

5. The programming system of claim 1 wherein the software code of said computer software product is separate from the code and data in said database.

6. The computer program product of claim 1, wherein said linkage software includes software code for linking said first command to different modes with different rule checks and rule actions.

7. The computer program product of claim 6, wherein said first command is a delete concept command and one of the different modes has a rule action to disallow the delete concept command and the other of the different modes has a rule action to delete child concepts to satisfy the preconditions of the delete concept command.

8. The computer program product of claim 1, wherein said first command is in a string of commands to perform a function.

9. The computer program product of claim 8, including one or more reverse commands for each command in the string of commands to delete each command that is executed when a subsequent command in the string fails a rule check.

10. A computer system comprising
    a) a computer processor,
    b) a storage system,
    c) a database stored in the storage system,
    d) a user interface for using the computer processor to manipulate the database system,
    e) modification software responsive to the user interface for checking and enabling updates in the database with the user interface including:
       i) a rules module containing rule checks determining whether suitable preconditions exist for modifications to said database,
       ii) a separate command module containing commands linked to appropriate ones of the rule checks in the rules module; and
       iii) linkage software linking the command module to one or more of the rule checks in the rules module that determine if the preconditions exist; and
       iv) an action module for carrying out the command when the preconditions exist and for providing alternative ways to bringing about said preconditions, if said preconditions do not exist.

11. The computer system of claim 10, including software code for providing commands for reversing any command taken when a subsequent command of the update fails a rule check.

12. The computer system of claim 10, including software code for altering semantic checking behavior at run time through selection among different modes for which rule checks and rule actions have been defined.

13. The computer system of claim 12, wherein the software code of the rules and command code modules permit customization of said semantic checking in different database applications by adding, removing, and or replacing said rule checks associated with a particular command.

14. The computer system of claim 10, wherein the modification software code is separate from the code and data in said rule based database.

15. The computer system of claim 10 wherein the computer system is a network of computers with the modification software on one of the computers and the database is on another one of the computers.

16. In a computer system containing software on a transporting medium for checking and enabling updates in a database, comprising:
    a rules module separate from others containing rule checks determining whether suitable preconditions exist for a modification to said database,
    a first command separate from the rules module containing a command for carrying out the modification if the preconditions exist, which command is linked at run time to one or more of the rule checks in the rules module to determine if the preconditions exist;
    linkage software for the linking the first command to the one or more of the rule checks at run time; and
    an action module responsive to the rule check for providing actions to bring about said preconditions if any of said one or more of the rule checks indicate that the preconditions do not initially exist.

17. The computer software product of claim 16, including software code for providing commands for reversing the command if taken when a latter command of the update fails a rule check.

18. The computer software product of claim 17, including software code for altering semantic checking behavior at run time by selecting among different modes for which rule checks and rule actions have been defined.

19. The computer software product of claim 18, including software code for permitting customization of said semantic checking in different database applications by adding, removing, and/or replacing said rule checks associated with a particular command.

* * * * *